US008959329B2

(12) United States Patent
Altman

(10) Patent No.: US 8,959,329 B2
(45) Date of Patent: Feb. 17, 2015

(54) SYSTEM AND METHOD FOR SELECTIVE INSPECTION OF ENCRYPTED TRAFFIC

(75) Inventor: Yuval Altman, Herzeliya (IL)

(73) Assignee: Verint Sytems, Ltd.., Herzelia Pituach (IL)

( * ) Notice: Subject to any disclaimer, the term of this patent is extended or adjusted under 35 U.S.C. 154(b) by 83 days.

(21) Appl. No.: 13/446,338

(22) Filed: Apr. 13, 2012

(65) Prior Publication Data

US 2012/0290829 A1 Nov. 15, 2012

(51) Int. Cl.
*H04L 29/06* (2006.01)
*G06F 15/16* (2006.01)

(52) U.S. Cl.
CPC ......... *H04L 63/1416* (2013.01); *H04L 63/0236* (2013.01); *H04L 63/0464* (2013.01); *H04L 63/168* (2013.01)
USPC ........... 713/150; 713/153; 713/154; 709/225; 709/226; 709/229

(58) Field of Classification Search
CPC ..... H04L 9/08; H04L 63/0428; H04L 9/0442; H04L 9/00; H04N 7/1375
USPC ........... 713/150, 153–154; 709/225–226, 229
See application file for complete search history.

(56) References Cited

U.S. PATENT DOCUMENTS

| 5,689,442 | A | 11/1997 | Swanson et al. |
| 6,404,857 | B1 | 6/2002 | Blair et al. |
| 6,718,023 | B1 | 4/2004 | Zolotov |
| 6,757,361 | B2 | 6/2004 | Blair et al. |
| 7,216,162 | B2 | 5/2007 | Amit et al. |
| 7,466,816 | B2 | 12/2008 | Blair |
| RE40,634 | E | 2/2009 | Blair et al. |
| 7,587,041 | B2 | 9/2009 | Blair |
| 8,074,267 | B1 * | 12/2011 | Stimpson ........................ 726/13 |
| 2003/0018891 | A1 * | 1/2003 | Hall et al. ...................... 713/160 |
| 2003/0097590 | A1 * | 5/2003 | Syvanne ....................... 713/201 |

(Continued)

FOREIGN PATENT DOCUMENTS

WO   2007023465 A1   3/2007

OTHER PUBLICATIONS

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

(Continued)

*Primary Examiner* — Evans Desrosiers
(74) *Attorney, Agent, or Firm* — Meunier Carlin & Curfman

(57) ABSTRACT

Inspection of encrypted network traffic where multiple network connections are monitored that carry encrypted data, but only a subset of the network connections are decrypted and inspected. Typically, only network connections that are associated with designated target users whose encrypted data is to be inspected are decrypted. A Network Monitor Center (NMC) dynamically establishes a list of rules for selection of encrypted data connections. The rules are provided to a Secure data Inspection Appliance (SIA) that accepts some or all of the network user encrypted traffic and checks it against a rule table. When detecting an encrypted connection that matches the rule table, the SIA decrypts the connection and provides a copy of the connection plain data to the NMC. The NMC then inspects the plain data for security threats. Once a security threat is found in a connection, the NMC applies predefined consequent actions to this connection.

16 Claims, 2 Drawing Sheets

(56) References Cited

U.S. PATENT DOCUMENTS

| | | | |
|---|---|---|---|
| 2008/0014873 A1 | 1/2008 | Krayer et al. | |
| 2008/0261192 A1 | 10/2008 | Huang et al. | |
| 2008/0285464 A1 | 11/2008 | Katzir | |
| 2010/0107223 A1* | 4/2010 | Zheng | 726/3 |
| 2010/0263017 A1* | 10/2010 | Matti et al. | 726/1 |
| 2011/0238855 A1* | 9/2011 | Korsunsky et al. | 709/231 |
| 2011/0314270 A1* | 12/2011 | Lifliand et al. | 713/151 |
| 2012/0243547 A1* | 9/2012 | Pardo-Blazquez et al. | 370/401 |

OTHER PUBLICATIONS

Rohde & Schwarz GmbH & Co. KG, "ACCESSNET-T, DMX-500 R2, Digital Mobile eXchange," Product Brochure, Secure Communications, Mar. 2000, 4 pages.

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "Integrated Digital Audio Software R&S AllAudio," Specifications, 8 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fisk, Mike, et al., "Applying Fast String Matching to Intrusion Detection," Los Alamos National Laboratory and University of California San Diego, 22 pages.

Fox Replay BV, "FoxReplay Analyst," http//www.foxreplay.com, Revision 1.0, Nov. 2007, 5 pages.

Fox-IT BV, "FoxReplay Analyst," Product Brochure, http//www.foxreplay.com, 2 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Soghoian, Christopher, et al., "Certified Lies: Detecting and Defeating Government Interception Attacks Against SSL," 19 pages.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Yu, Fang, et al., "Gigabit Rate Packet Pattern-Matching Usint TCAM," Proceedings of the 12th IEEE International Conference on Network Protocols (ICNP'04) 10 pages.

Extended European Search Report, dated Aug. 29, 2012, received from the European Patent Office in connection with corresponding European Application No. 12163917.3.

\* cited by examiner

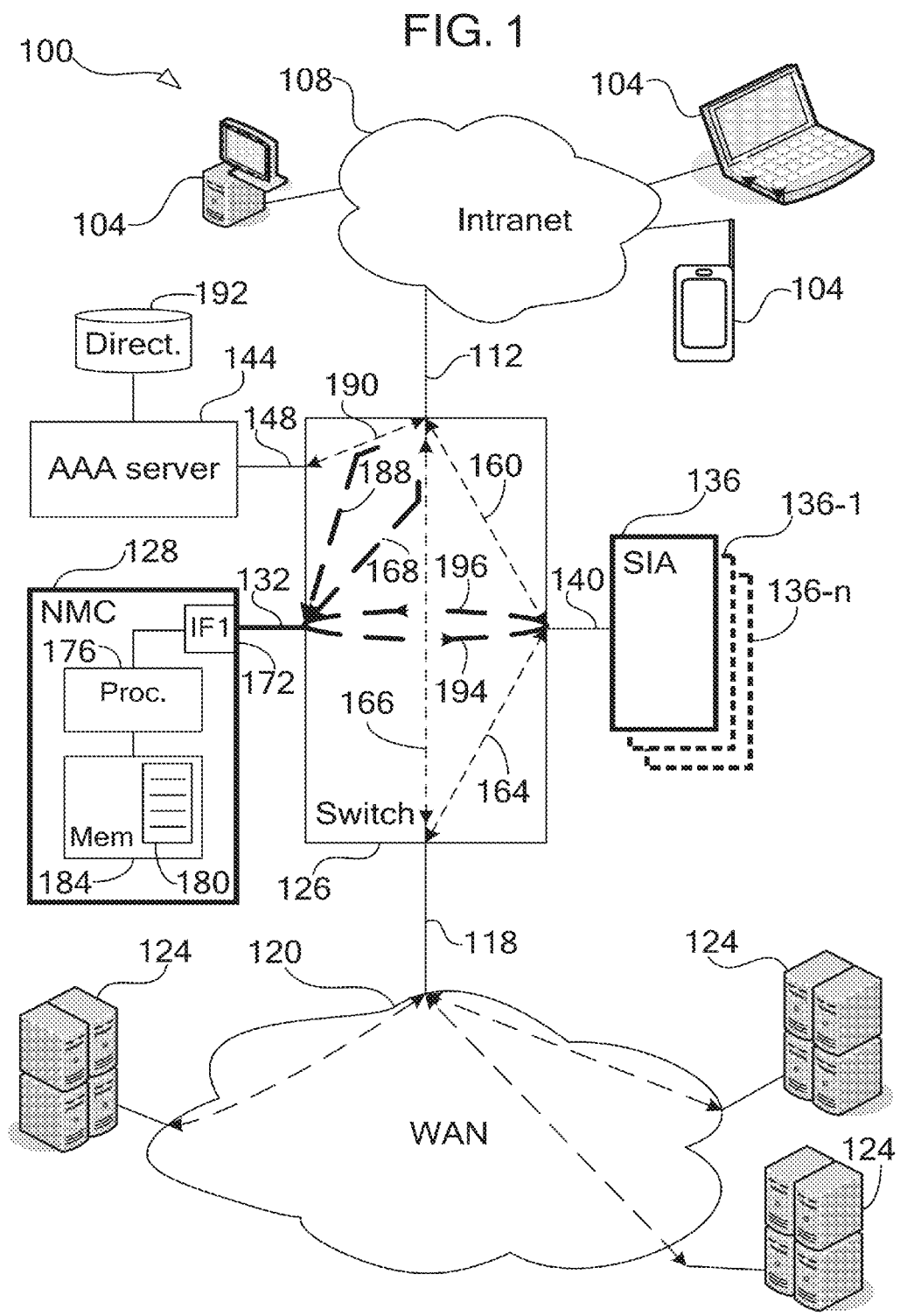

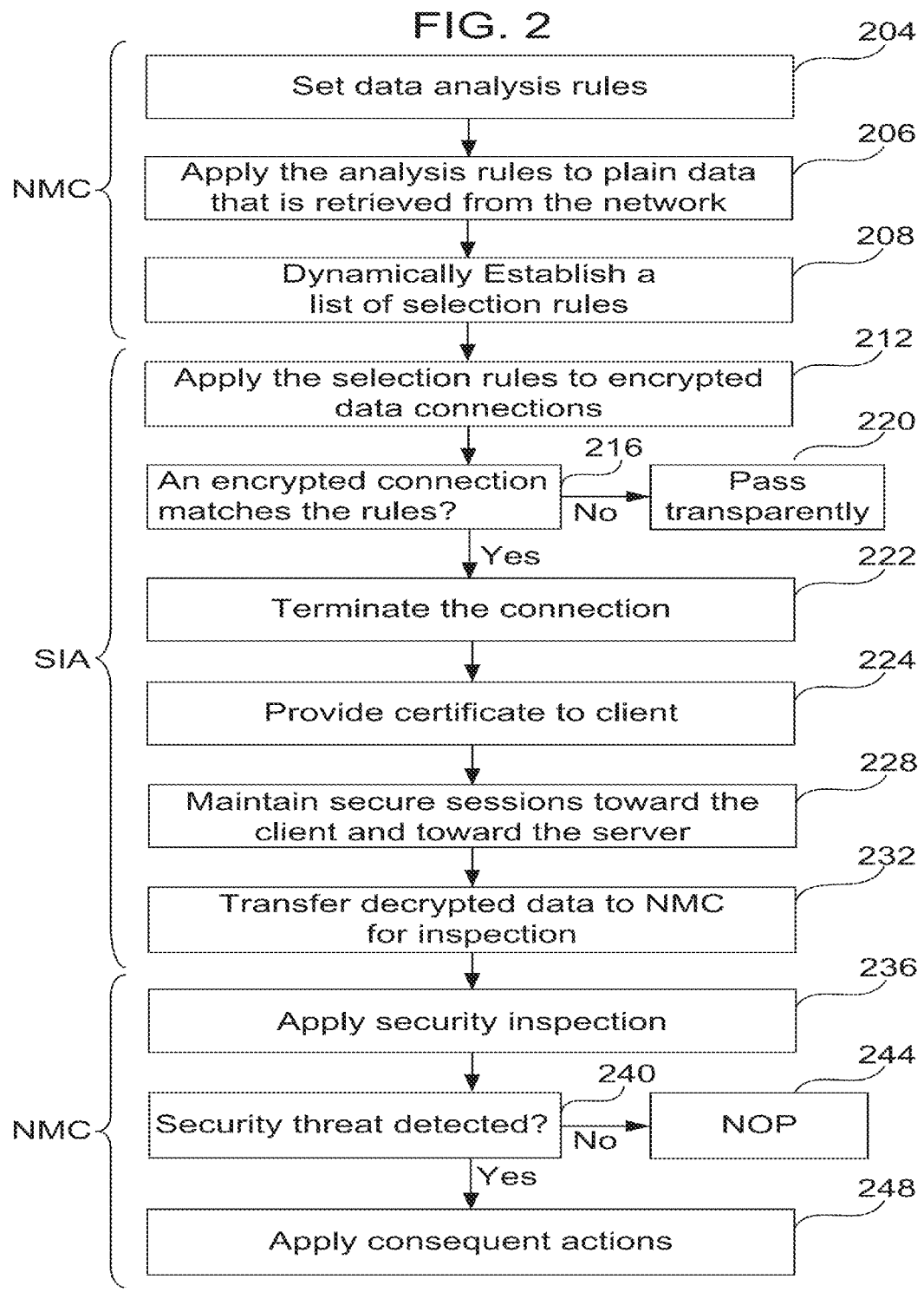

US 8,959,329 B2

SYSTEM AND METHOD FOR SELECTIVE INSPECTION OF ENCRYPTED TRAFFIC

FIELD OF THE DISCLOSURE

The present disclosure relates generally to secure communication, and particularly to methods and systems for inspection of encrypted communication.

BACKGROUND OF THE DISCLOSURE

The Transport Layer Security (TLS) Protocol and its predecessor, Secure Socket Layer (SSL), are examples of cryptographic protocols that provide security and data integrity for communications over Transmission Control Protocol (TCP)/Internet Protocol (IP) networks such as the global Internet. TLS is specified by the Internet Engineering Task Force (IETF) in RFC 5246, entitled "The Transport Layer Security (TLS) Protocol Version 1.2," August, 2008, which is incorporated herein by reference.

SUMMARY OF THE DISCLOSURE

An embodiment that is described herein provides a method that includes analyzing data relating to users of a communication network, which carries multiple data connections conveying encrypted data, so as to establish one or more selection rules. A subset of the multiple data connections is selected based on the selection rules. An inspection device is configured to decrypt the encrypted data conveyed by the data connections in the selected subset.

In some embodiments, analyzing the data includes identifying one or more target users of the communication network, and defining the selection rules to select the data connections associated with the target users. In an embodiment, analyzing the data includes obtaining respective identifiers of one or more target users by communicating with an authentication node of the communication network, and selecting the subset includes choosing the data connections associated with the obtained identifiers. In a disclosed embodiment, the authentication node includes a Remote Authentication Dial-In User Service (RADIUS) server. In another embodiment, the identifiers include temporary Internet Protocol (IP) addresses that are assigned to the target users.

In yet another embodiment, analyzing the data includes defining the selection rules so as to identify one or more of the data connections that carry malicious content. In still another embodiment, selecting the subset includes configuring a network switch to forward only the selected subset of the network connections to the inspection device. Configuring the network switch may include causing the network switch to distribute the network connections in the subset among multiple inspection devices in accordance with a load balancing criterion. In an embodiment, the encrypted data has been encrypted in accordance with a Secure Socket Layer (SSL) protocol. In another embodiment, the encrypted data has been encrypted in accordance with a Transport Layer Security (TLS) protocol.

There is additionally provided, in accordance with an embodiment that is described herein, apparatus including one or more network interfaces and a processor. The network interfaces are configured to communicate with a communication network that carries multiple data connections conveying encrypted data. The processor is configured to analyze data relating to users of the communication network so as to establish one or more selection rules, to select a subset of the multiple data connections based on the selection rules, and to configure an inspection device to decrypt the encrypted data conveyed by the data connections in the selected subset.

There is additionally provided, in accordance with an embodiment that is described herein, apparatus including a monitoring unit and an inspection device. The monitoring unit is configured to analyze data relating to users of a communication network, which carries multiple data connections conveying encrypted data, so as to establish one or more selection rules, to select a subset of the multiple data connections based on the selection rules, and to output an indication of the selected subset. The inspection device is configured to receive the indication of the selected subset from the monitoring unit, to decrypt the encrypted data conveyed by the data connections in the selected subset, and to output the decrypted data.

The present disclosure will be more fully understood from the following detailed description of the embodiments thereof, taken together with the drawings in which:

BRIEF DESCRIPTION OF THE DRAWINGS

FIG. 1 is a block diagram that schematically illustrates a system for selective inspection of encrypted network traffic, in accordance with an embodiment of the present disclosure; and FIG. 2 is a flowchart that schematically illustrates a method for selective SSL inspection, in accordance with an embodiment of the present disclosure.

DETAILED DESCRIPTION OF EMBODIMENTS

Overview

Encrypted network traffic imposes a challenge to various security applications, such as data leakage prevention, intrusion detection and prevention, and lawful interception. While providing security for end users, encrypted network traffic can be used for illegitimate purposes, such as for transferring malicious software or illegitimate content while circumventing security applications. Embodiments that are described herein provide improved methods and systems for inspection of encrypted traffic in communication network.

Some security applications inspect encrypted traffic in order to protect communication networks against such threats. Inspection solutions are offered, for example, by Blue Coat Systems (Sunnyvale, Calif.), and by Check Point Software Technologies (Tel Aviv, Israel). Example inspection solutions that are produced by Netronome Systems, Inc. (Cranberry Twp., Pa.) are described in "Examining SSL-Encrypted Communications—Netronome SSL Inspector™ Solution Overview," February, 2010, which is incorporated herein by reference. SSL inspection products are also offered by Packet Forensics, Inc. (Tempe, Ariz.). SSL inspection is also addressed by Soghoian and Stamm, in "Certified Lies: Detecting and Defeating Government Interception Attacks Against SSL," April, 2010, which is incorporated herein by reference.

Embodiments that are described herein provide improved methods and systems for inspection of encrypted network traffic. These methods and systems monitor multiple network connections that carry public-key encrypted data, but decrypt and inspect only a selected subset of the network connections. Typically, the disclosed techniques identify and decrypt only network connections that are associated with one or more designated target users whose encrypted data is to be inspected. The network connections for inspection can be selected using various selection criteria, examples of which are described herein.

In an example embodiment, a Network Monitor Center (NMC) analyzes plain (unencrypted) data that relates to users of a communication network according to predefined analysis rules. Based on the analysis, the NMC dynamically establishes a list of rules for selection of encrypted data connections. For example, an analysis rule may specify a network access login-name the of a target user, and a resulting selection rule would specify a temporary IP address that the network allocates to the target user once he or she logs in to the network. The NMC provides this list, as a "rule table," to a Secure data Inspection Appliance (SIA) and keeps updating this table upon changes in the list. The SIA accepts some or all of the network user encrypted traffic and checks it against the rule table. The SIA transfers transparently the encrypted connections that do not match the rule table. However, when detecting an encrypted connection that matches the rule table, the SIA decrypts the connection and provides a copy of the connection plain data to the NMC. The NMC then inspects the plain data for security threats. Once a security threat is found in a connection, the NMC applies predefined consequent actions to this connection.

By selectively inspecting only the encrypted connections that match the dynamically established selection rule list, the methods and systems described herein make efficient use of encrypted traffic inspection resources. As such, the disclosed techniques are highly scalable and enable reliable traffic inspection on high-volume communication channels. Moreover, since encrypted traffic inspection is sometimes noticeable by the end user due to using a substitute certificate, the selective inspection techniques described herein reduce the nuisance to users and also the likelihood of being discovered, making them useful in lawful interception applications.

System Description

FIG. 1 is a block diagram that schematically illustrates a system 100 for selective inspection of encrypted network traffic between clients and servers, in accordance with an embodiment of the present disclosure. System 100 comprises three client devices 104 that are connected to an Intranet 108. The three devices 104 represent any number and any type of device such as desktop, laptop and smart-phone. An Intranet 108 represents any type of local network, typically Internet Protocol (IP) based. In an embodiment, such a network comprises an enterprise Local Area Network (LAN) or an Internet Service Provider (ISP) access network.

Lines 112 and 118 illustrate a communication channel between Intranet 108 and a Wide Area Network (WAN) 120, which conveys multiple user connections that carry plain and encrypted data. In typical embodiments WAN 120 comprises the Internet which is the most global WAN in the world. The connections within communication channel 112/118 connect client devices 104 and remote servers 124 that are connected over the WAN. Note that for the sake of brevity, client devices 104 are herein denoted as "clients" and remote servers 124 are denoted as "servers." The three servers 124 shown in FIG. 1 represent any number of servers over the WAN.

The encrypted flows within 112/118 channel typically comprise SSL/TLS encrypted TCP data connections. However, in alternative embodiments the encrypted flows may comprise any suitable encryption technique such as IP security (IPSec). SSL/TLS traffic is denoted herein SSL for the sake of brevity. The SSL traffic is normally characterized by various application specific protocol types, e.g. HTTPS for browsing application and SSL-POP/SSL-IMAP/SSL-SMTP for email application. Additionally or alternatively, encrypted connections can be used also for Internet faxing, instant messaging, Voice-Over-IP (VoIP) or any other suitable application. In yet alternative embodiments the disclosed techniques can be used for any suitable connection or connectionless type of messaging transfer with an appropriate encryption mechanism.

A network switch 126 routes the 112/118 traffic between Intranet 108 and WAN 120. In addition, it connects and transfers data to and from various parts of system 100. The combination of Intranet 108, WAN 120 and switch 126 is hereinafter denoted "network" in general. In particular, a Network Monitoring Center (NMC) 128 is connected to the switch through a connection 132, a SIA 136 is connected to the switch through a connection 140 and an Authentication Authorization and Accounting (AAA) server 144 is connected to the switch through a connection 148. In an embodiment AAA server 144 comprises a Remote Authentication Dial-In User Service (RADIUS) server. In alternative embodiments Switch 126 may represent multiple Ethernet switches and or IP routers, LAN connections, WAN connections and/or any combination thereof. The dashed lines depict traffic flows within switch 126. In particular, Lines 160/164 represent principally all the encrypted connections within traffic 112/118. SIA 136 normally passes this encrypted traffic transparently.

NMC 128 accepts from switch 126, via connection 132 and an interface 172, plain (i.e. not encrypted) data that is related to devices 104 or their users. The NMC constantly analyzes this data according to predefined analysis rules. Based on the analysis the NMC dynamically establishes a list of rules for selection of encrypted data connections out of 160/164 connections. The application of the selection rules is described below. As an example of rule establishment, the NMC accepts from the switch, through a tap or a mirror port not shown in FIG. 1, a flow 168, which comprises a copy of principally all the plain part of traffic 112/118, depicted by a line 166. The NMC constantly analyzes the traffic copy by means of a processing unit 176, according to predefined malware detection rules. Once processing unit 176 detects a malware (malicious content) received at a specific client device 104, it writes in a rule table 180, which resides in memory 184, the IP address of the device as a selection rule. The processor also assigns a life period to each selection rule according to predefined criteria.

As another example, the predefined analysis rules at the NMC comprise target user login-names for accessing Intranet 108, wherein those target users are candidates for lawful interception by the network. NMC 128 accepts from switch 126 a data flow 188, which comprises a copy of an AAA message flow 190 that pertains to AAA server 144. Processor 176 analyses the AAA messages and upon detecting a predefined target user login-name it searches, in the messages, for association between the detected login-name and a temporary IP address that is dynamically allocated to it by an access management function of Intranet 108 (not shown in FIG. 1). Processor 176 then adds the discovered IP address to the selection rule table. In an alternative embodiment the NMC may achieve temporary IP addresses by direct querying a directory 192 of AAA server 144 or by querying Broadband Access Servers (BRASs), not shown in FIG. 1. Rule table 180 may include, alternatively or additively, any other suitable selection rule, e.g. a URL that is associated with a message in which malware is detected and/or any combination of the above rules.

Processing unit 176 transfers rule table 180 to SIA 136 via switch 126, as illustrated by flow 194, and keeps updating this table in the SIA upon changes in the rules. SIA 136 applies the selection rules to the encrypted data that it transfers. Upon detecting an encrypted connection that matches at least one of the rules, the SIA decrypts the connection data, as exemplified hereinafter, and transfers the decrypted plain data to NMC 128. This transfer is depicted as flow 196. The NMC then inspects the decrypted plain data for security threats, as described in more detail hereinafter.

Although application of the disclosed techniques significantly reduces the burden imposed on SIA 136, in large systems this burden may still be too heavy for a single appliance. Therefore, in an embodiment, switch 126 distributes the encrypted traffic among multiple SIAs, which are denoted in FIG. 1 as 136, 136-1 . . . **136-*n***. The switch may distribute the load among the SIAs according to any suitable load balancing technique known in the art.

Processing unit 176 typically comprises a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory. In some embodiments, NMS 128, and in particular processing unit 128 or parts thereof, may be implemented using hardware modules such as Field-Programmable Gate Arrays (FPGAs) and/or Application-Specific Integrated Circuits (ASICs).

In alternative embodiments the security application that inspects the decrypted data for security threats resides elsewhere in system 100 rather than within NMC 128. Yet in alternative embodiments the NMC and SIA monitor and inspect, alternatively or additionally, other communication channels than Intranet-to-WAN communication. For example, they can handle also data channels within Intranet 108, including traffic that pertains to application servers within Intranet 108, and data channels within WAN 120. In specific embodiments wherein the AAA flow 190 is encrypted, the SIA or the NMC or some other unit in the system would decrypt it prior to its analysis by the NMC.

The configurations of systems 100 and NMC 128 shown in FIG. 1 are example configurations, which were chosen purely for the sake of conceptual clarity. In alternative embodiments, any other suitable system and NMC configurations can also be used. For example, the disclosed techniques can be carried out by any suitable processor or processors, typically located at any suitable location en-route from the client devices to the services that offer encrypted communications.

The NMC functionality may be carried out by any suitable computing device that correlates between the SIA and the AAA server, and has a GUI or API to define "targets" for inspection. NMC functions can be embodied, for example, in a lawful interception compliance system operated by communication service providers (like the STAR-GATE system produced by Verint Systems, Inc. (Melville, N.Y.)). As another example, NMC functions may be embodied in a security application (e.g., data leakage prevention application).

Alternatively to RADIUS, AAA server 144 may comprise any suitable type of AAA server. Generally, any directory service such as Lightweight Directory Access Protocol (LDAP), any AAA protocol such as RADIUS or Diameter, and any IP assignment protocol like Dynamic Host Configuration Protocol (DHCP), may be used.

The above description has focused on the specific elements of systems 100 and NMC 128 that are essential for understanding certain features of the disclosed techniques. Elements that are not needed for this understanding have been omitted from the figures for the sake of simplicity but will be apparent to persons of ordinary skill in the art.

Method Description

FIG. 2 is a flowchart that schematically illustrates a method for selective SSL inspection, in accordance with an embodiment that is described herein. The method begins with a setting analysis rule step 204, in which NMC 128 is configured with data analysis rules, e.g. login-names of target users and malware detection rules. At a data analysis step 206 the NMC analyzes plain user data and/or AAA information that it accepts from Intranet 108 through switch 106 or directly from AAA server 144. At a selection rules establishment step 208 NMC 128 dynamically establishes a list of rules for later selection of encrypted data connections. Such rules may comprise temporary IP addresses that are allocated to target users by a Dynamic Host Configuration Protocol (DHCP) server, client IP addresses or server URLs that pertain to malware contaminated connections or any other suitable selection rule.

At a selection rule application step 212, SIA 136 applies the selection rules, which it accepts from the NMC, to encrypted connections 160/164 that pass through it. At a decision step 216, SIA 136 determines the next method step for each new encrypted connection that appears in 160/164 traffic. If the new connection does not match any selection rule the method proceeds to a passing transparently step 220. If the new connection matches at least one selection rule the method proceeds to a connection termination step 222. SIA 136 carries out the termination at step 222 by cutting the matching connection and substituting it with a pair of separate TCP connections, one toward the related client 104 along data flows 112 and 160, and the other toward the related server 124 along data flows 118 and 164. In alternative embodiments SIA 136 decrypts the connection data without terminating it and proceeds from step 216 directly to step 232.

Certificate providing step 224, which follows, relates to Public Key Infrastructure (PKI) based security implementation. In this implementation the SIA functions as a Man In The Middle (MITM) and provides client 104 with a substitute server certificate on behalf of the real server 108. In enterprise environment client browsers may be pre-configured to accept the SIA's certificate. In public environment such pre-configured is normally not applicable. In alternative embodiments, wherein non-PKI based channel encryption is implemented, step 224 is not applicable. At a session maintaining step 228, SIA 136 maintains separate secure connections, typically SSL/TLS based, over the above mentioned terminated TCP connections, while decrypting the encrypted data that it receives from each end party and re-encrypting it back-to-back toward the opposite party. The SIA thus constitutes an SSL proxy for secure connections that it terminates. At a transfer step 232 the SIA transfers the decrypted plain data of the connection in question to the NMC for inspection. In some embodiments SIA 136 transfers to the MNC plain data of only one of the pair of connections that pertain to a terminated encrypted connection. In alternative embodiments the SIA determines this aspect according to the selection rules that it accepts from the NMC.

At an inspection step 236 NMC 128 inspects the plain data of the decrypted connections against security threats, such as sensitive information leak from Intranet 108 and malware contamination. At a decision step 240 the NMC determines the method step that follows the inspection. If no security threat is detected then no further action is required regarding the inspected connection. This case is denoted by a no-operation step 244. If some security threat is detected, the flowchart proceed to an action application step 248, in which the MNC applies predefined consequent actions that correspond to the detected threat. As an example, sensitive information leaks, as well as malwares, can be blocked. As another example, predefined information types that relate to target users may be copied and logged.

The flowchart shown in FIG. 2 is an example flowchart, which was chosen purely for the sake of conceptual clarity. In alternative embodiments, any other suitable operation sequence can also be used for carrying out the disclosed techniques. Method steps and details that are not mandatory for understanding the disclosed techniques were omitted from the figure for the sake of clarity.

Although the embodiments described herein mainly address selective inspection of encrypted traffic, the principles of the present disclosure can be used also for other applications that involve inspection of data traffic.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method comprising:
   intercepting data from a communication network, wherein the communication network carries data connections conveying the data, wherein the data relates to users of the communication network, and wherein the data comprises encrypted data;
   determining or identifying plain data from the intercepted data, wherein the plain data comprises unencrypted data;
   analyzing the plain data, by an apparatus with a hardware module comprising a processor, to establish one or more selection rules by:
   detecting predefined criteria,
   searching the plain data for an IP address allocated to at least one of the data connections,
   searching the plain data for an association between the predefined criteria and the IP address,
   upon discovering the searched association, adding the discovered IP address to a selection rule table;
   selecting a subset of the data connections for selective inspection of encrypted data, wherein the selection is based on the selection rules, wherein selecting the subset further comprises configuring a network switch to forward only the selected subset of the network connections to an inspection device, and wherein configuring the network switch further comprises causing the network switch to distribute the network connections in the subset among multiple inspection devices in accordance with a load balancing criterion; and
   configuring the inspection device to decrypt the encrypted data conveyed by the data connections in the selected subset.

2. The method according to claim 1, wherein analyzing the plain data comprises identifying one or more target users of the communication network, and defining the selection rules so that one or more data connections associated with the target users are included in the selected subset.

3. The method according to claim 1, wherein analyzing the plain data comprises obtaining respective identifiers of one or more target users by communicating with an authentication node of the communication network, and wherein selecting the subset comprises choosing the data connections associated with the obtained identifiers.

4. The method according to claim 3, wherein the authentication node comprises a Remote Authentication Dial-In User Service (RADIUS) server.

5. The method according to claim 3, wherein the identifiers comprise temporary Internet Protocol (IP) addresses that are assigned to the target users.

6. The method according to claim 1, wherein analyzing the plain data comprises defining the selection rules so as to identify one or more of the data connections that carry malicious content.

7. The method according to claim 1, wherein the encrypted data has been encrypted in accordance with a Secure Socket Layer (SSL) protocol.

8. The method according to claim 1, wherein the encrypted data has been encrypted in accordance with a Transport Layer Security (TLS) protocol.

9. An apparatus comprising:
   a network interface that intercepts data from a communication network, wherein the communication network carries data connections conveying the data, wherein the data relates to users of the communication network, and wherein the data comprises encrypted data; and
   a hardware module comprising a processor that:
   determines or identifies plain data from the intercepted data, wherein the plain data comprises unencrypted data;
   analyses the plain data to establish one or more selection rules by detecting predefined criteria,
   searching the plain data for an IP address allocated to at least one of the data connections,
   searching the plain data for an association between the predefined criteria and the IP address, and
   upon discovering the searched association, adding the discovered IP address to a selection rule table;
   selects a subset of the data connections for selective inspection of encrypted data, wherein the selection is based on the selection rules, wherein the processor configures a network switch to forward only the selected subset of the network connections to an inspection device, and further wherein the processor causes the network switch to distribute the network connections in the subset among multiple inspection devices in accordance with a load balancing criterion; and
   configures the inspection device to decrypt the encrypted data conveyed by the data connections in the selected subset.

10. The apparatus according to claim 9, wherein the processor identifies one or more target users of the communication network by analyzing the plain data and defining the selection rules to include the data connections associated with the target users.

11. The apparatus according to claim 9, wherein the processor obtains respective identifiers of one or more target users by communicating with an authentication node of the communication network, and selects the subset by choosing the data connections associated with the obtained identifiers.

12. The apparatus according to claim 11, wherein the authentication node comprises a Remote Authentication Dial-In User Service (RADIUS) server.

13. The apparatus according to claim 11, wherein the identifiers comprise temporary Internet Protocol (IP) addresses that are assigned to the target users.

14. The apparatus according to claim 9, wherein the processor defines the selection rules so as to identify one or more of the data connections that carry malicious content.

15. The apparatus according to claim 9, wherein the encrypted data has been encrypted in accordance with one of a Secure Socket Layer (SSL) protocol and a Transport Layer Security (TLS) protocol.

16. An apparatus comprising a processor coupled to a memory:
- a monitoring unit that
  - intercepts data from a communication network, wherein the communication network carries data connections conveying the data, wherein the data relates to users of the communication network, and wherein the data comprises encrypted data,
  - determines or identifies plain data from the intercepted data, wherein the plain data comprises unencrypted data,
  - analyzes the plain data to establish one or more selection rules by detecting predefined criteria,
    - searching the plain data for an IP address allocated to at least one of the data connections,
    - searching the plain data for an association between the predefined criteria and the IP address, and
    - upon discoverying the searched association, adding the IP address to a selection rule table,
  - selects a subset of the data connections for selective inspection of encrypted data, wherein the selection is based on the selection rules, wherein the monitoring unit configures a network switch to forward only the selected subset of the network connections to an inspection device, and further wherein the monitoring unit causes the network switch to distribute the network connections in the subset among multiple inspection devices in accordance with a load balancing criterion, and
- outputs an indication of the selected subset; and
- the inspection device that
  - receives the indication of the selected subset from the monitoring unit; decrypts the encrypted data conveyed by the data connections in the selected subset, and outputs the decrypted data.

\* \* \* \* \*